Mar. 3, 1925.

B. M. COFFEE

POWER TRANSMISSION

Filed June 23, 1923

INVENTOR
Bassett M. Coffee
BY Robert S. Blair
ATTORNEY

Mar. 3, 1925.
B. M. COFFEE
POWER TRANSMISSION
Filed June 23, 1923
1,528,530
2 Sheets-Sheet 2
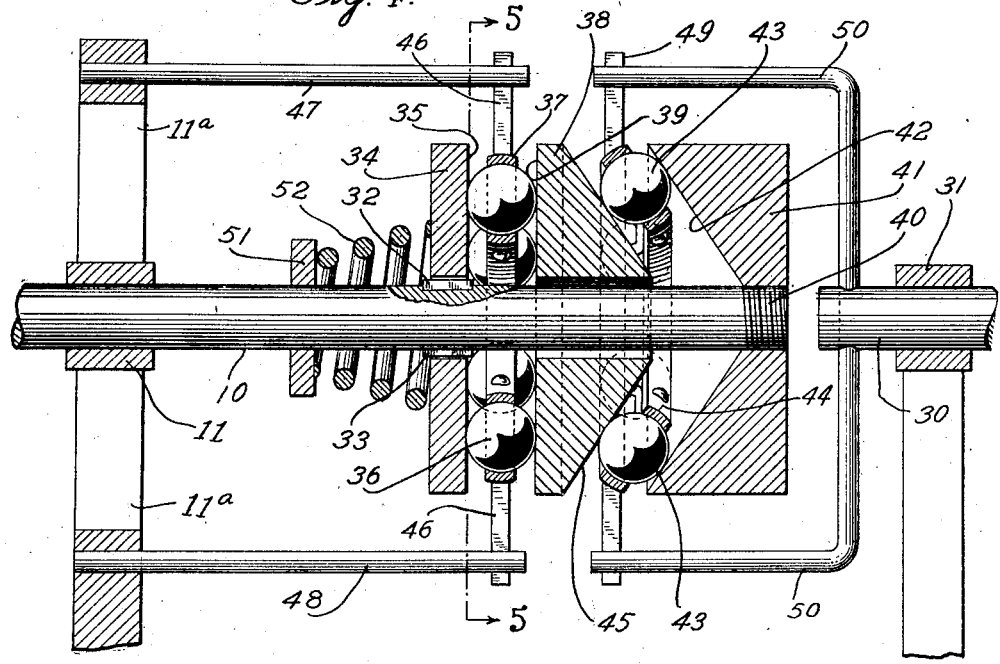
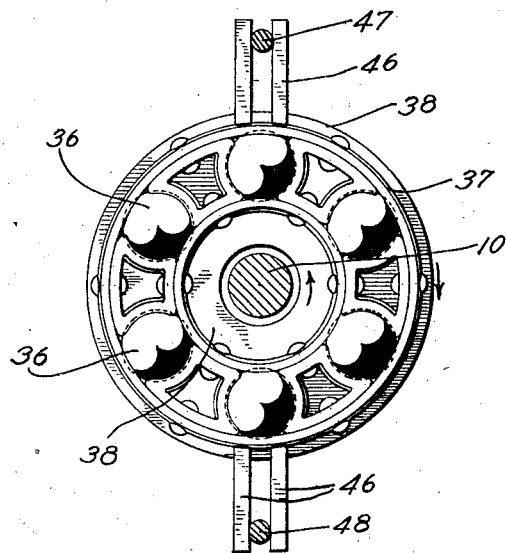
INVENTOR
Bassett M. Coffee
BY Robert S. Blair
ATTORNEY Patented Mar. 3, 1925.

1,528,530

UNITED STATES PATENT OFFICE.

BASSETT M. COFFEE, OF NEW HAVEN, CONNECTICUT, ASSIGNOR TO THE SAFETY CAR HEATING & LIGHTING COMPANY, A CORPORATION OF NEW JERSEY.

POWER TRANSMISSION.

Application filed June 23, 1923. Serial No. 647,221.

*To all whom it may concern:*

Be it known that I, BASSETT M. COFFEE, a citizen of the United States, and a resident of New Haven, in the county of New Haven and State of Connecticut, have invented an improvement in Power Transmissions, of which the following is a specification.

This invention relates to apparatus for power transmission and more particularly to apparatus for transmitting power at reduced speeds.

One of the objects of the invention is to provide apparatus capable of dependably transmitting power at a large reduction of speed. Another object is to provide apparatus of the above character practical and efficient and well adapted to meet the requirements of practical operation. Another object is to provide such apparatus which is simple in construction and operation and inexpensively made. Another object is to provide apparatus of the above nature which is at all times efficient and dependable. Other objects will be in part obvious or in part pointed out hereinafter.

The invention accordingly consists in the features of construction, combinations of elements, and arrangements of parts all as will be illustratively herein described and the scope of the application of which will be indicated in the following claims.

In the accompanying drawings in which are shown one or more various possible embodiments of the several features of this invention, Figure 1 is a vertical, sectional elevation of a power transmitting device;

Figure 4 is a view similar to Figure 1 showing a modification;

Figure 5 is a section taken substantially along the line 5—5 of Figure 4.

Similar reference characters refer to similar parts throughout the several views of the drawings.

Figure 1:
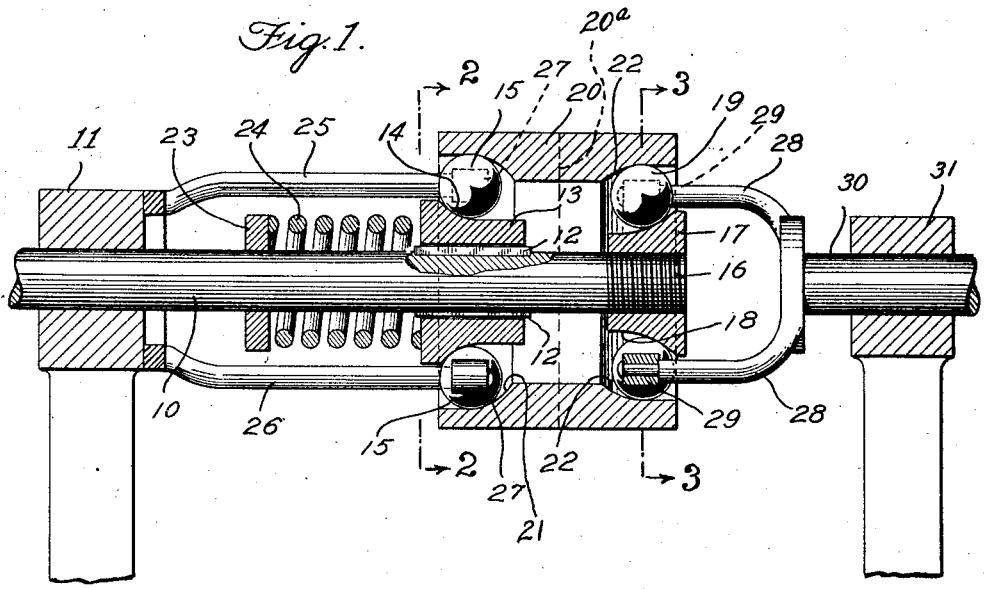

Referring now to the drawings in detail with reference first to Figure 1, there is shown a driving shaft 10 which it will be understood is connected to a source of power and which is supported in suitable bearings such as 11, for example. Splined upon the shaft 10, as at 12 so as to rotate with the shaft 10 and yet be capable of longitudinal movement along the same, is a collar 13. The collar 13 has an annular surface 14 which forms the inner race for a plurality of balls 15 which it will be understood may be of any desired number, being shown in the drawings as two in number for the sake of convenience. Rigidly secured to the shaft 10, as by means of threading 16 is a collar 17 providing an annular surface 18 which serves as the inner race for another series of balls 19. The balls 19 may be of any desired number, being herein shown as two in number. About the shaft 10 is an outer ring or sleeve 20 provided with an annular surface 21 which serves as an outer race for the balls 15, and provided with an annular surface 22 which serves as an outer race for the balls 19.

Rigidly secured to the shaft 10 by any suitable means is a collar 23 between which and the collar 13 is interposed a compression spring 24 coiled about the shaft 10. The spring 24 thus bearing against the collar 13 urges it to the right as viewed in Figure 1. The respective races for the balls 15 and 19 upon the collars 13 and 17 and the ring 20 are curved in contour as shown so that the spring 24 urging the collar 13 to the right results in a firm positive contact between the surfaces of the balls and their respective races.

Figure 2:
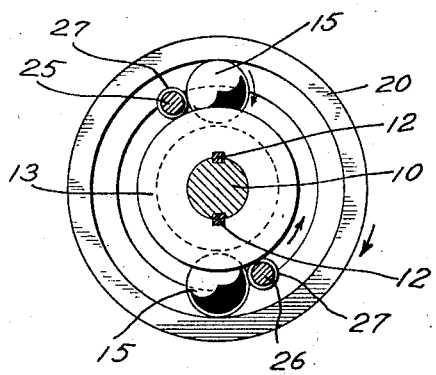
Figure 2 is a section taken substantially along the line 2—2 of Figure 1.

As the shaft 10 rotates, the balls 15 in rolling contact with the collar 13 tend to move about the axis of the shaft 10. A pair of stationary arms such as 25 and 26 secured to the bearing 11 for example are provided which rest in the path of the balls 15 preventing their movement about the axis of the shaft 10. The arms 25 and 26 are preferably provided with rollers such as 27 which permit the balls 15 to rotate about their individual axes with little friction. Thus as the shaft 10 rotates, the balls 15 prevented from revolution about the shaft 10 by the arms 25 and 26, rotate about their individual axes and in so doing, being in rolling contact with the ring 20 transmit to the ring 20 a rotation about the shaft 10 in a direction opposite to that of the shaft 10. The directions of rotation of these parts may be readily seen in Figure 2.

Figure 3:
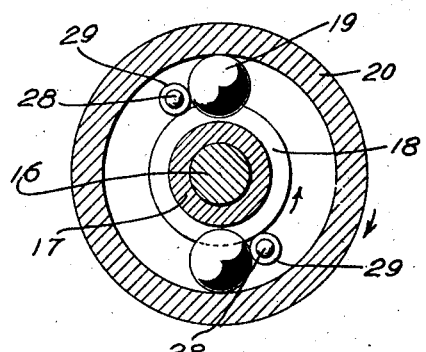
Figure 3 is a section taken substantially along the line 3—3 of Figure 1.

The balls 19 in rolling contact with the ring 20 and the collar 17 are not prevented from revolution about the shaft 10 as are the balls 15. The arms 28 provided with suitable rollers 29 projecting into the path of revolution of the balls 19 are connected to a shaft 30 shown as rotatably mounted in bearings 31. The collar 17 rotates in the same direction as the shaft 10 which is opposite to the direction or rotation of the ring 20. Thus the collar 17 tends to cause the balls 19 to revolve about the shaft 10 in one direction and the ring 20 tends to cause the balls 19 to revolve in the other direction. The direction of rotation of the ring 20 and of the collar 17 is indicated by the arrows in Figure 3. Furthermore, it will be seen that the speed of rotation of the ring 20 is different from the speed of rotation of the shaft 10 depending upon the diameter of the balls 15 or the difference in diameter between the races 21 and 14. The balls 19 in rolling contact with the two surfaces 18 and 22, and permitted free rotation about their own axes, are thus given a revolution about the axis of the shaft 10, the speed of which revolution is determined by a function of the difference between the rotative speeds of the ring 20 and the collar 17 or by a function of the difference between the surface speeds of the two surfaces 22 and 18, since the ring 20 and the collar 17 are rotated in opposite directions. The revolution of the balls 19 about the axis of the shaft 10 is transmitted through the arms 28 to rotate the driven shaft 30. If desired the member 20 may be split as indicated along the line 20ª and thus divided into two sections, thereby permitting the outer races for the sets of balls to adjust themselves to any slight eccentricity of the inner races, the friction between the two sections of the member 20 under the pressure of the spring 24 serving to maintain driving connection.

From the above, it will be seen that a substantial reduction in speed of rotation may be had between the driving shaft 10 and the driven shaft 30. Furthermore, if the surface speed of the race 18 is greater than the surface speed of the race 22, the shaft 30 will be rotated in a direction the same as the direction of rotation of the shaft 10, and if the surface speed of the race 22 is greater than the surface speed of the race 18, the shaft 30 will be rotated in a direction opposite to the direction of rotation of the shaft 10. Thus by proper selection of the diameters of the different ball races and of the sizes of balls, a wide selection of speed reductions is available and furthermore the direction of rotation of the driven shaft relative to that of the driving shaft may be determined. The spring 24 serves at all times to dependably hold the balls in firm contact with their respective races so that a reliable rolling friction is had without danger of slippage.

Referring now to Figures 4 and 5, there is shown a modification of the device shown in the preceding figures. Splined upon the driving shaft 10 as at 32 and 33 so as to rotate with the shaft 10 and yet be permitted longitudinal movement along the shaft, is a member 34 having a substantially plane surface 35 which serves as a race for a set of balls 36. The balls 36 may be of any desired number and are preferably held in spaced relation to each other and to the shaft 10 by means of a ball retainer 37 mounted loosely upon the shaft 10. A member 38 loosely mounted upon the shaft 10 is provided with a substantially plane surface 39, serving as the other race for the set of balls 36. Rigidly mounted upon the shaft 10, as for example by means of thread 40 is a member 41 provided with a surface 42 which is inclined at an angle with respect to the axis of the shaft 10 and which serves as one race for the set of balls 43. The balls 43 may be of any desired number and are preferably held in spaced relation to each other and to the shaft 10 by means of a ball retainer 44, loosely mounted about the shaft 10. The member 38 is provided with a surface 45 which is opposite to and preferably substantially parallel with the surface 42 of the member 41. The surface 45 serves as the other race for the set of balls 43.

The balls 36 are prevented from revolution about the axis of the shaft 10 by any suitable means, for example by means of lugs 46 secured to the ball race 37 and engaging rigid arms as 47 and 48 may be mounted in extensions 11ª of the bearing 11 for example. The balls 36, loosely held in the ball retainer 37, are permitted free rotation about their individual axes. The ball retainer 44 is provided with projecting lugs as 49 which engage arms 50, the arms 50 being connected to the driven shaft 30 mounted in suitable bearings 31. The balls 43 are permitted free rotation about their individual axes within the retainer 44 and any revolution of the balls 43 about the axis of the shaft 10 is transmitted through the retainer 44, lugs 49 and arms 50 to give rotation to the driven shaft 30. Rigidly secured to the driving shaft 10 by any suitable means is a collar 51 between which and the member 34 is interposed a compression spring 52. The spring 52 thus urges the member 34 to the right as viewed in Figure 4 and firmly holds the balls 36 and 43 in contact with their respective races.

As the member 34 is rotated by the driving shaft 10, the balls 36, being in rolling contact with the members 34 and 38 and being restrained from revolution about the axis of the shaft 10, transmit rotation to the member 38. The direction of the resulting rotation of the member 38 is opposite to the direction of rotation of the shaft 10 and the member 34. The member 41 being rigidly connected to the shaft 10, rotates with the shaft 10 and thus in a direction opposite to the direction of rotation of the member 38. Therefore the two surfaces 42 and 45, serving as races for the balls 43, move in opposite directions about the axis of the shaft 10, the surface 42 tending to cause the balls 43 to revolve about the axis of the shaft 10 in one direction and the surface 45 tending to cause the balls 43 to revolve about the axis of the shaft 10 in the opposite direction. Due to the inclination of the surfaces 42 and 45, the distance from the axis of the shaft 10 to that portion of the surface 42 engaged by the balls 43 is greater than the distance from the axis of the shaft 10 to that portion of the surface 45 which is engaged by the balls 43. Therefore the surface speed of the surface 42 engaging the balls 43 is greater than the surface speed of the surface 45 engaging the balls 43. Since the surface 42 tends to revolve the balls 43 about the axis of the shaft 10 in one direction and the surface 45 tends to revolve the balls 43 in the opposite direction, the resulting revolution of the balls 43 about the axis of the shaft 10 is determined by a function of the difference between these two surface speeds. This resulting revolution of the balls 43 is, as above described, transmitted through the arms 50 to rotate the driven shaft 30.

Thus it will be seen that by proper selection of the angle of inclination of the surfaces 42 and 45, a wide selection in reductions of speed between the driving shaft 10 and the driven shaft 30 may be had. Furthermore by inclining the surfaces 42 and 45 in the opposite direction so that the diameter of the circle determining the path of travel of the balls 43 upon the surface 45 is greater than that upon the surface 42, the direction of the rotation of the driven shaft 30 may be made opposite to that of the driving shaft 10. The spring 52 serves always to hold the sets of balls in firm rolling contact with their respective races so that danger of slippage is minimized.

As various possible embodiments might be made of the above invention, and as the embodiments shown might be varied in various ways without departing from the scope of the invention, it is to be understood that all matter herein set forth or shown in the accompanying drawings is to be interpreted as illustrative and not in a limiting sense.

I claim as my invention:

1. In apparatus of the class described, in combination, a rotatively driven shaft, a set of balls, a collar mounted upon said shaft, rotatable therewith, capable of relative longitudinal movement therewith and providing a race for said set of balls, a second set of balls, a member secured to said shaft and providing a race for said second set of balls, a rotatable member interposed between said two sets of balls and providing a race for both, means urging said movable collar along said shaft to urge said balls against their respective races, means preventing revolution of one of said sets of balls about said shaft, a second shaft, and means adapted to transmit revolution of said second set of balls about said first shaft to said second shaft to rotate the latter.

2. In apparatus of the class described, in combination, a rotatively driven shaft, a collar on said shaft rotated therefrom and slidable longitudinally thereof, a second collar rigidly secured to said shaft, a rotatable member interposed between said two collars, rolling friction means between said first collar and said rotatable member, a second rolling friction means between said second collar and said rotatable member, means urging said first collar along said shaft to force said two rolling friction means into driving relation between said rotatable member and said respective collars, means restraining one of said rolling friction means from revolution about said shaft, and means driven from the revolution of said other rolling friction means about said shaft.

3. In apparatus of the class described, in combination, a rotatively driven shaft, two sets of balls about said shaft, a rotatable member interposed between said two sets of balls and providing a race for both, a pair of collars mounted upon said shaft to rotate therewith, each respectively providing a second race for one of said sets of balls, said collars being relatively movable along said shaft, means urging said collars toward each other to urge said balls against their respective races, means restraining one of said sets of balls from revolution about said shaft, and means driven from the revolution of said other set of balls about said shaft.

4. In apparatus of the class described, in combination, a rotatively driven shaft, a set of balls, a collar mounted on said shaft to rotate therewith capable of longitudinal movement along said shaft and providing a race for said set of balls, a rotatable member providing a second race for said set of balls and driven therethrough from said shaft, a second set of balls, a second collar fixed upon said shaft providing a race for said second set of balls, a second race for said second set of balls provided upon said rotatable member, the surfaces of said last two races rotating at different surface speeds and said second set of balls being revolved about said shaft thereby, means urging said first collar toward said second collar to urge said balls against their respective races, means restraining said first set of balls from revolution about said shaft, and means driven from the revolution of said second set of balls about said shaft.

5. In apparatus of the class described, in combination, a rotatively driven shaft, a set of balls, a collar mounted upon said shaft to rotate therewith capable of longitudinal movement along said shaft and providing a race for said set of balls, a second set of balls, a second collar fixed upon said shaft and providing a race for said second set of balls, a ring-shaped member about said shaft between said two sets of balls and providing a race for each, a compression spring about said shaft urging said first collar toward said second collar to force said balls against their respective races, means restraining said first set of balls from revolution about said shaft and means driven from the revolution of said second set of balls about said shaft.

In testimony whereof, I have signed my name to this specification this 16th day of June, 1923.

BASSETT M. COFFEE.